United States Patent
Gray

(10) Patent No.: US 11,760,381 B1
(45) Date of Patent: Sep. 19, 2023

(54) CONTEXTUALLY-AWARE DYNAMIC SAFETY ENVELOPE FOR AUTONOMOUS VEHICLES

(71) Applicant: GM Cruise Holdings LLC, San Francisco, CA (US)

(72) Inventor: Drew Gray, Pacifica, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 193 days.

(21) Appl. No.: 17/196,945

(22) Filed: Mar. 9, 2021

Related U.S. Application Data

(60) Provisional application No. 62/994,168, filed on Mar. 24, 2020.

(51) Int. Cl.
*B60W 60/00* (2020.01)
*B60W 40/105* (2012.01)
*G06V 20/56* (2022.01)
*B60W 50/00* (2006.01)

(52) U.S. Cl.
CPC .... *B60W 60/00184* (2020.02); *B60W 40/105* (2013.01); *G06V 20/56* (2022.01); *B60W 2050/0062* (2013.01); *B60W 2520/06* (2013.01)

(58) Field of Classification Search
CPC ......... B60W 60/00184; B60W 40/105; B60W 2050/0062; B60W 2520/06; B60W 30/10; B60W 30/12; G06V 20/56; B60Y 2300/12; B60T 8/17557; B60T 2201/08; B62D 1/28
See application file for complete search history.

(56) References Cited

U.S. PATENT DOCUMENTS

| | | | |
|---|---|---|---|
| 9,229,453 B1* | 1/2016 | Lee | B60W 10/20 |
| 11,479,244 B2* | 10/2022 | Sone | B62D 15/025 |
| 11,479,259 B2* | 10/2022 | Hamagami | G06V 40/10 |
| 2013/0231830 A1* | 9/2013 | Van Dan Elzen | B60W 50/16 701/41 |
| 2015/0298694 A1* | 10/2015 | Park | B60W 10/18 701/41 |
| 2016/0107682 A1* | 4/2016 | Tan | B62D 6/00 701/41 |
| 2016/0368534 A1* | 12/2016 | Harda | B62D 15/025 |
| 2017/0248959 A1* | 8/2017 | Matsubara | B60W 30/00 |
| 2018/0292832 A1* | 10/2018 | Bae | G05D 1/0214 |
| 2018/0334166 A1* | 11/2018 | Zhu | B60W 30/12 |

(Continued)

*Primary Examiner* — Fadey S. Jabr
*Assistant Examiner* — Faris Asim Shaikh
(74) *Attorney, Agent, or Firm* — CALFEE, HALTER & GRISWOLD LLP

(57) ABSTRACT

A vehicle with autonomous navigation abilities ensures that the vehicle will remain within a safe driving region, such as the current lane, even in the case of a system failure. The vehicle's autonomous control subsystem computes driving parameters used to follow a path of the vehicle toward the current destination. These driving parameters are used to compute a safety envelope describing a region that the vehicle could reach from the present position in case of system failure before coming to a stop. The safety envelope is compared to a current safe driving region, and if the safety envelope violates the boundaries of the safe driving region, the driving parameters and corresponding safety envelopes are recomputed until the currently-computed safety envelope no longer violates the boundaries of the safe driving region.

15 Claims, 3 Drawing Sheets

(56) References Cited

U.S. PATENT DOCUMENTS

| | | | |
|---|---|---|---|
| 2019/0009779 A1* | 1/2019 | Kim | B62D 6/10 |
| 2019/0061811 A1* | 2/2019 | Odate | B62D 5/0463 |
| 2019/0086929 A1* | 3/2019 | Tamboli | B60W 30/12 |
| 2019/0106117 A1* | 4/2019 | Goldberg | G05D 1/0088 |
| 2019/0317520 A1* | 10/2019 | Zhang | G05D 1/0274 |
| 2020/0023843 A1* | 1/2020 | Van Dan Elzen | B62D 6/00 |
| 2020/0156640 A1* | 5/2020 | Jonasson | B60W 30/143 |
| 2020/0233418 A1* | 7/2020 | Liu | G05D 1/0231 |
| 2020/0247400 A1* | 8/2020 | Fujii | B60W 30/18163 |
| 2022/0324445 A1* | 10/2022 | Yamazaki | B62D 15/021 |
| 2022/0332316 A1* | 10/2022 | Münning | B60W 30/10 |

* cited by examiner

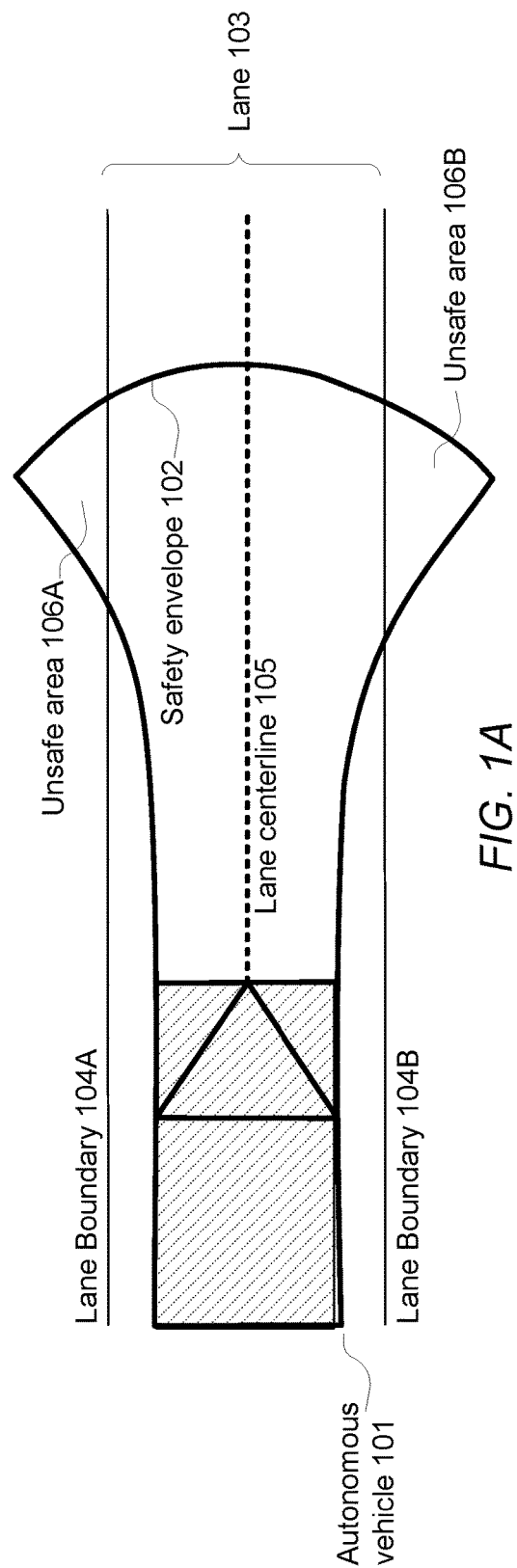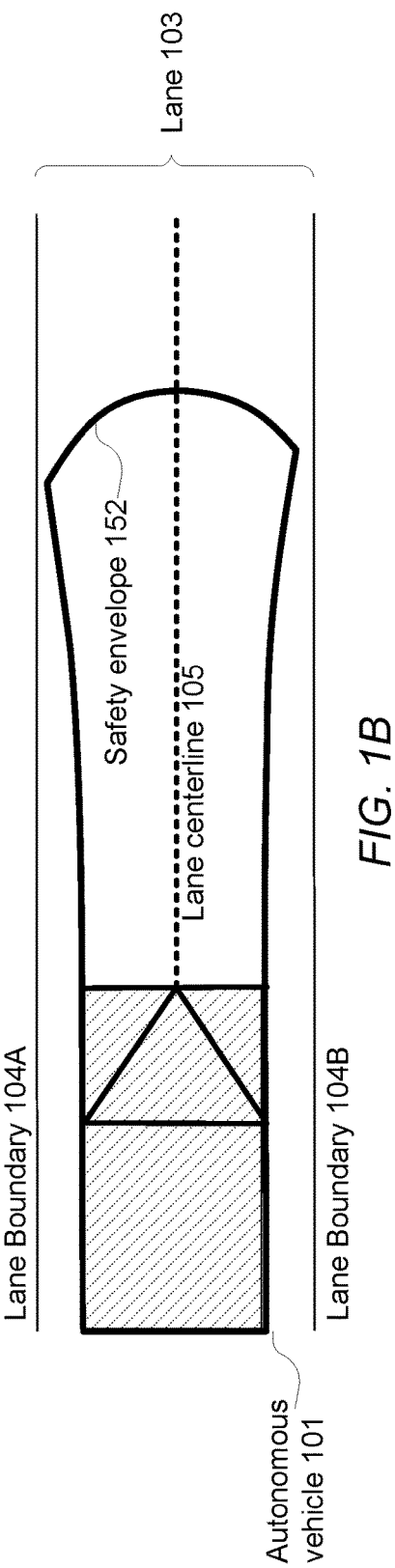

CONTEXTUALLY-AWARE DYNAMIC SAFETY ENVELOPE FOR AUTONOMOUS VEHICLES

RELATED APPLICATIONS

This application claims the benefit of Provisional Application No. 62/994,168, filed on Mar. 24, 2020, which is incorporated herein by reference.

FIELD OF ART

This disclosure relates generally to the field of vehicle navigation, and more specifically, to navigation of autonomous vehicles so as to ensure passenger safety.

BACKGROUND

Some conventional advanced driver assistance safety systems (ADAS) attempt to constrain vehicle movement so that the vehicle will remain within its own lane even in case of system failure. These systems typically are composed of a speed-based look-up table that further limits the allowed steering angle change rate as the speed increases. This look-up table—correlating speed ranges with permitted steering angle change rates—is fixed and hard-coded beforehand based on an analysis of the system and the corresponding failure criteria. Since this method relies on a fixed look-up table to limit the steering based on speed, it is possible to get into a dangerous situation in which the method will fail because the current driving environment does not conform to the assumptions in place when the mapping table was created. For example, if a user of an automated lane keeping system specifies a high vehicle speed on a curvy highway having a degree of road curvature that is outside of the range expected when creating the mapping table, there could be a situation in which the system does not permit a steering angle change rate that is high enough to navigate a particular curve of the highway, leading the vehicle to drift out of its current lane, potentially leading to a collision with other vehicles, leaving the road entirely, or a like dangerous situation.

SUMMARY OF THE INVENTION

By making a vehicle system contextually-aware, such dangers can be avoided. More specifically, by allowing the "safety envelope" to be determined as a function of a set of driving parameters—e.g., vehicle speed, steering angle, and steering angle change rate—and continuously updating the permissible values for these parameters as the system operates, it is possible to keep the vehicle in a safe state while still allowing the control needed for roadway navigation. (The "safety envelope" represents the worst-case vehicle positions: that is, the area comprising the set of all positions to which the vehicle could potentially travel from its current position as the navigation system brakes the vehicle to a halt in the case of a failure of the autonomous navigation system.) For example, on a straight road with a relatively high speed limit, where rapid changes in steering angle are not required due to the straightness of the road, the allowed steering change rate can be significantly reduced, thereby permitting a higher vehicle speed than would be possible for a higher allowed steering angle change rate. If there is a critical error with the autonomous navigation system, the vehicle's emergency braking system will be able to bring the vehicle to a stop without the vehicle ever exiting the lane. In the case of a highly curving road, in contrast, the steering angle change rate can be increased while the permitted speed is decreased. By optimizing these driving parameters it is possible to constrain the worst-case vehicle position to always be within a region of safety (e.g., the vehicle's current lane), even in the case of sudden system failure.

Accordingly, the vehicle system performs periodic, proactive recalculations of the vehicle's current safety envelope based on current driving parameters, adjusting the parameters as necessary to ensure that the safety envelope remains within a given region of safety (e.g., the current lane).

BRIEF DESCRIPTION OF DRAWINGS

FIGS. 1A and 1B respectively illustrate an example safety envelope corresponding to the current driving parameters that provides inadequate assurance of vehicle safety, and a subsequent example safety envelope that results from adjusting driving parameters so as to ensure vehicle safety.

Figure 2:
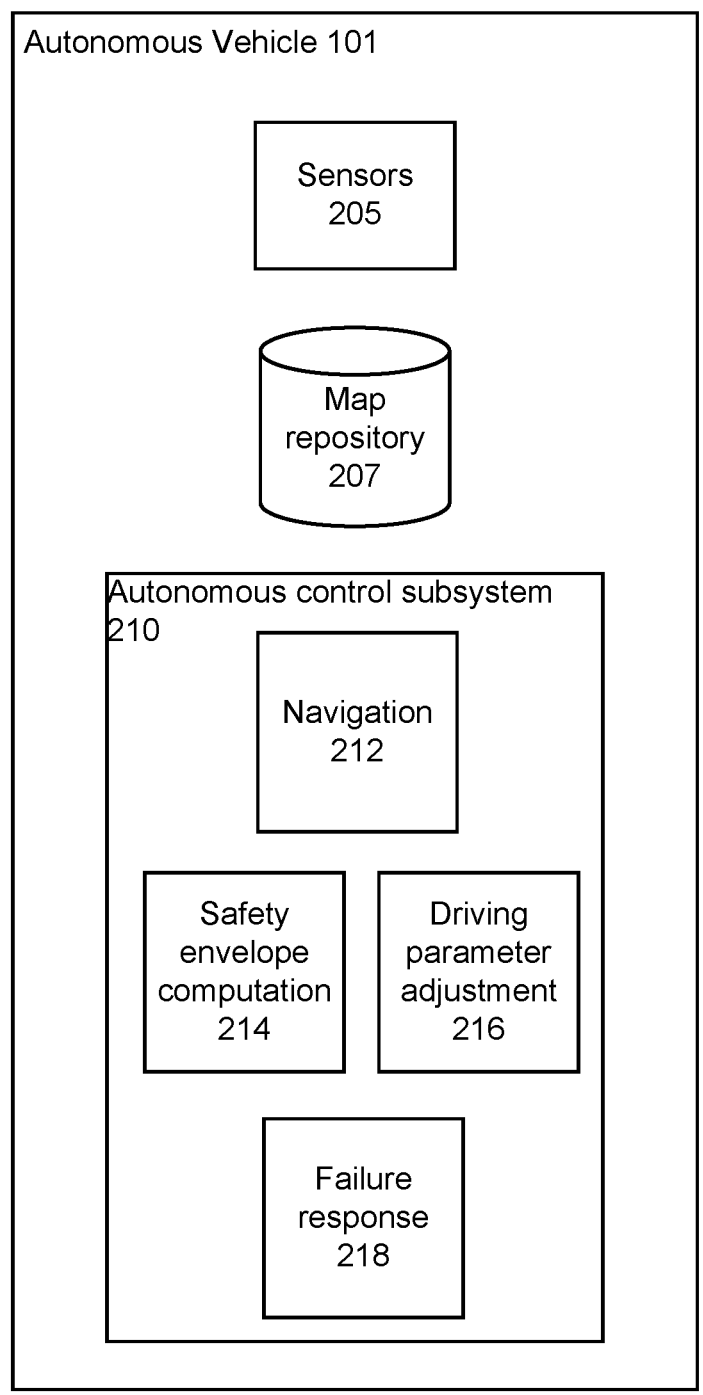
FIG. 2 is a high-level block diagram illustrating a detailed view of an autonomous vehicle that employs dynamic adjustment of driving parameters to ensure that the vehicle safety envelope remains within a safe region even in the case of system failure, according to some embodiments.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

FIGS. 1A and 1B respectively illustrate a safety envelope corresponding to the current driving parameters that provides inadequate assurance of vehicle safety (FIG. 1A), and a subsequent safety envelope that results from adjusting driving parameters so as to ensure vehicle safety (FIG. 1B).

In FIG. 1A, the combination of the current driving parameters (e.g., vehicle speed, steering angle, and allowed steering angle change rate) of a vehicle 101 result in a safety envelope 102 that intersects the lane boundaries 104 and exceeds the vehicle's current lane 103, straying into unsafe areas 106. (Unsafe area 106A represents the various positions outside of the current lane 105 in which the vehicle could end up before coming to a complete stop if the vehicle was angled to the left at time of system failure; similarly, unsafe area 106B represents the various positions outside of the current lane in which the vehicle could end up before coming to a complete stop if the vehicle was angled to the right at time of system failure.) In this situation the worst-case scenario (i.e., maximum steering torque to either direction) will lead the vehicle 101 to exit the lane 105 as it decelerates in case of system failure.

In FIG. 1B, in contrast, the driving parameters have been adjusted, such that the new combination of the parameters defines a modified safety envelope 152 indicating that the vehicle 101 never exits the lane 105, even in the worst-case failure scenario.

FIG. 2 is a high-level block diagram illustrating a detailed view of an autonomous vehicle 101 that employs dynamic adjustment of driving parameters to ensure that the vehicle safety envelope remains within a safe region even in the case of system failure, according to some embodiments.

The autonomous vehicle 101 has one or more sensors 205 or other input devices, such as cameras to observe the road, sensors to determine current vehicle speed and/or orientation, other input devices to obtain the present geographic location of the vehicle (e.g., GPS coordinates), and/or the like.

The autonomous vehicle 101 also stores, or has access to, a map repository 207 that stores electronic map data about geography related to the driving of the autonomous vehicle 101, such as data about roads and road segments, intersections, stop signs, traffic signals, speed limits, and/or the like.

The autonomous vehicle 101 further has an autonomous vehicle control subsystem 110, which is software that permits the vehicle to be driven partially or fully autonomously, rather than relying upon a driver of the autonomous vehicle to control the vehicle. The autonomous vehicle control system 210 includes a navigation component 212, which contains functionality for driving tasks such as computing a route from a current position to a desired location, for controlling vehicle operating parameters such as speed and direction so as to remain in the proper portion of a road at the proper speed, and the like.

The autonomous vehicle control system 110 further includes a failure response module 218, which takes actions to increase driving safety in the unlikely event of a vehicle failure. For example, if the navigation component 212 ever ceases to be able to properly control the vehicle 101 for purposes of normal driving (e.g., due to a hardware malfunction leading to the generation of an unfeasible steering command, to a communication breakdown that prevents the most recent steering command from being transmitted, or the like), the failure response module 218 will cause the vehicle apply its brakes so as to come to a safe stop within a region of safety (such as the current lane of driving).

The autonomous vehicle control system 210 additionally includes a safety envelope computation module 214 and a driving parameter adjustment module 216, which operate together so as to ensure that the vehicle 101 is driving in a manner that will enable it to come to a safe stop within a region of safety should the failure response module 218 need to be invoked. The operations of the safety envelope computation module 214 and the driving parameter adjustment module 216 are now described in more detail with respect to FIG. 3.

Figure 3:
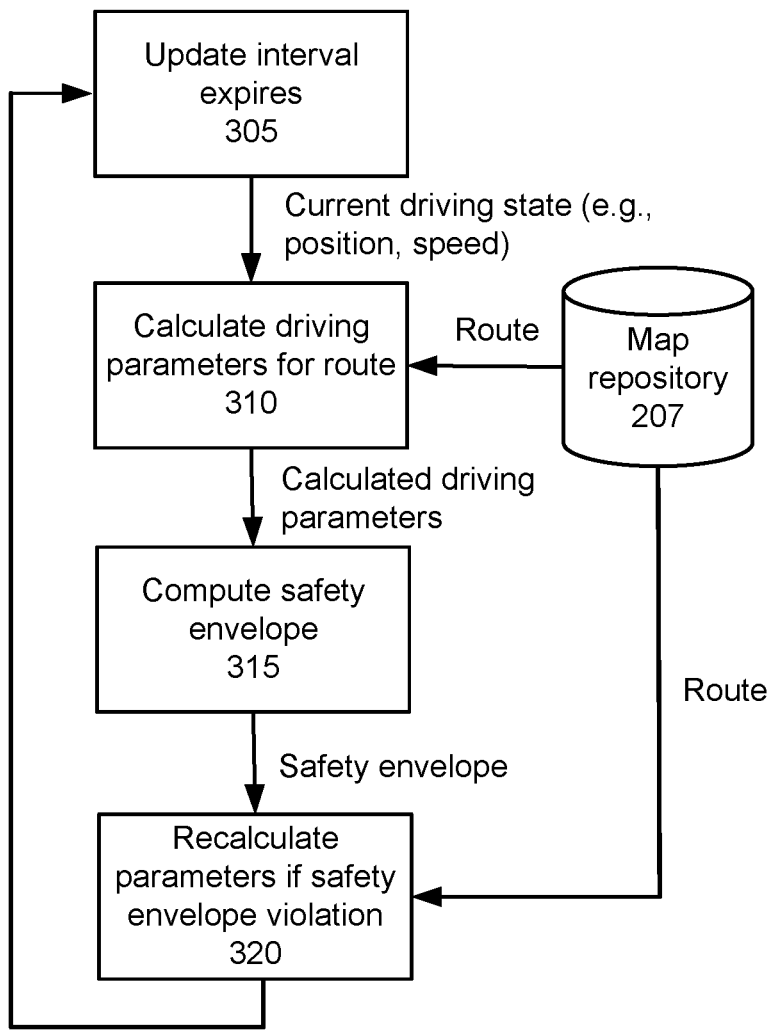
FIG. 3 is a flowchart illustrating the operations of the driving parameter adjustment module and of the safety envelope computation module of FIG. 2 when adjusting vehicle driving parameters so as to ensure that the vehicle will remain within a safe region even in the case of system failure, according to some embodiments.

FIG. 3 is a flowchart illustrating the operations of the driving parameter adjustment module 216 and of the safety envelope computation module 214 when adjusting vehicle driving parameters so as to ensure that the vehicle will remain within a safe region even in the case of system failure, according to some embodiments.

In step 305, an update interval of time expires, triggering the driving parameter adjustment module 216 to begin recalculation of the driving parameters of the vehicle 101 so as to preserve safety. In one embodiment, for example, the update interval is 100 milliseconds.

In step 310, the current position of the vehicle 101 is updated (e.g., using a GPS value obtained from the sensors 205), and the navigation module 212 uses data from the map repository 207 to generate the route from the current position to the vehicle's given destination. Given the route information, the driving parameters needed to navigate the route (e.g., required steering angle, steering angle rate, and speed) are calculated from the mathematical description of the vehicle dynamics. To accomplish this, in one embodiment the path planner uses a model predictive controller (MPC) to calculate the required path to follow the route. (The route is the description of how to get from origin A to destination B, as opposed to the path, which is the planned path for some ensuing time period, such as the next 5 seconds.) The MPC algorithm uses the mathematical description of the vehicle (such as an approximate kinetic model, or a high-fidelity dynamic model) to plan the vehicle's predicted path over the ensuing time period. The planned path is associated with both the spatial trajectory (x, y, t), where x and y are defined in meters and t is defined in seconds, and the driving parameters (e.g., steering angle, steering angle change rate, and speed to navigate the route). From the planned spatial trajectory, the driving parameters are determined. The driving parameters, in the case of an MPC algorithm, are the variables of an optimization problem. Solving this optimization problem (e.g., with techniques such as quadratic programming (QP) or differential dynamic programming (DDP)) yields the optimal driving parameters. In this case this is called optimal planning and control. There are, however, many ways to calculate the required steering angle rate and speed to follow a route and any appropriate path planning method can be used interchangeably.

In step 315, given the driving parameters computed in step 310, the safety envelope computation module 214 computes the safety envelope corresponding to those parameters (e.g., the safety envelopes in FIGS. 1A or 1B). This calculation assumes a failure of the navigation system 212 in which full torque is applied on the steering column, either left or right, and where the failure response module 218 system of the vehicle 101 detects the failure and applies full brakes. (The failure response module 218 may detect failure using plausibility checks across different signals, health-monitors and watchdogs for hardware and software components, and signal range validators, for example. Alternatively, the vehicle 101 can implement such systems with redundant software and hardware.) The safety envelope is the complete reachable set of possible positions that vehicle 101 can reach before it comes to a full stop. The safety envelope can be approximated succinctly in code as the furthest point—one to the left and one to the right—of the reachable set. These two points are calculated by simulating a failure. For example, in the event of a failure with full steering torque to the left, the failure response module 218 would respond during the next iteration of FIG. 2 by applying full deceleration. There will be a delay to the action because of the latency in the system, and a further delay for brake pressure build-up. Eventually, full deceleration is achieved, and the vehicle 101 comes to a stop. During deceleration, since in the prior example the vehicle experienced a simulated fault with full torque to the left, the vehicle would have veered to the left. The safety envelope computation module 214 uses a mathematical model that represents the dynamics of the vehicle 101 to calculate the reachable states. There are many different vehicle dynamic models and the driving parameter adjustment module 216 may choose a suitable model by identifying the current driving environment and select a model suitable for that environment. The chosen model for a particular environment is designed to capture the particular complexities of the environment and be tuned to be conservative in assuming a worst-case steering scenario (i.e., greatest permitted degree of steering angle to the left or right), leading to a worst-case safety envelope. For example, if the road surface is slippery, the mathematical model chosen captures the coefficient of friction between the road surface and the tire. If the vehicle is traveling at high speeds, the chosen model accounts for the nonlinear dynamics of the tire. Most simplified mathematical models are expressed in terms of current positions, speeds, and control inputs (steering angle rate and acceleration/deceleration).

As discussed below with respect to step 320, if the points determined by the reachables set calculation violate the boundaries of the lane (e.g., if either the leftmost or rightmost points of the reachable set are within some threshold distance of the nearest edge of the lane), as determined by the map repository 207, then the driving parameter adjustment module 216 iteratively reduces the driving parameters (e.g., speed and steering angle change rate) until the violation no longer occurs. (Note that in other embodiments, the safety computations may be performed with respect to some current safe driving region other than the current lane, such as all lanes going in the same direction, all lanes going in the same direction but excluding a bicycle lane, some center portion of the current lane, or the like. The relevant portion of the current driving region is determined based on the map repository 207 and on the vehicle's current position.)

In step 320, the safety envelope, as calculated in step 315, is compared against the current lane geometry, as determined from the map repository 207 and the current geographic position of the vehicle. The maximum extent of the safety envelope, either left or right, is used to determine whether the safety envelope violates the lane boundary. This is determined by comparing the position of the furthest points of the safety envelope with the known extents of the lane boundary. If the safety envelope does violate the lane boundary, the driving parameter adjustment module 216 iteratively reduces the values of the driving parameters (e.g., using an algorithm such as bisection, as just one example), and accordingly returns to step 315, using the safety envelope computation module 214 to recompute the safety envelope, until the safety envelope lies completely within the lane or other current safe driving region. This process is completed within one execution loop of the main stack so that the vehicle 101 never violates the safety constraints when using computed values of the driving parameters during the remainder of the period until the next recalculation (e.g., 100 ms).

Other considerations

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of embodiments. This description should be read to include one or at least one and the singular also includes the plural unless it is obvious that it is meant otherwise. The use of the term and/or is intended to mean any of: "both", "and", or "or."

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments.

What is claimed is:

1. A computer-implemented method for ensuring safety of an autonomous vehicle when navigating to a destination, the method comprising:
    determining a current driving state of the autonomous vehicle, the current driving state comprising vehicle position and vehicle speed;
    predicting, using electronic map data corresponding to the vehicle position, a path of the autonomous vehicle from the vehicle position toward the destination;
    computing, using the current driving state, a vehicle steering angle change rate and a vehicle speed required to follow the predicted path;
    computing, using the vehicle position, the computed vehicle speed, and the computed vehicle steering angle change rate, a current safety envelope of the autonomous vehicle, the current safety envelope having a boundary that is representative of a set of positions where the autonomous vehicle will come to a complete stop upon maximally decelerating at different steering angle change rates;
    identifying a current road lane of the autonomous vehicle using the electronic map data and the vehicle position;
    determining whether the boundary of the current safety envelope is contained within the boundaries of the lane; and
    responsive to determining that the boundary of the current safety envelope is not contained within the boundaries of the lane, adjusting at least one of the vehicle speed or the vehicle steering angle change rate of the autonomous vehicle such that a boundary of a subsequent safety envelope is contained within the boundaries of the lane.

2. The computer-implemented method of claim 1, wherein the safety envelope is defined as a set of positions between a left point corresponding to where the autonomous vehicle is capable of coming to the complete stop when a maximum leftward torque is applied at the current speed and a right point corresponding to where the autonomous vehicle is capable of coming to the complete stop when a maximum rightward torque is applied at the current speed, where each position in the set of positions corresponds to a position where the autonomous vehicle is capable of coming to the complete stop.

3. The computer-implemented method of claim 1, wherein the safety envelope is further computed based upon road surface conditions.

4. The computer-implemented method of claim 1, wherein the driving parameters are computed using a mathematical model of dynamics of the autonomous vehicle.

5. The computer implemented method of claim 1, further comprising executing the computer-implemented method repeatedly at a fixed time interval.

6. A computer-implemented method for ensuring safety of an autonomous vehicle when navigating to a destination, the method comprising:
    computing driving parameters used to follow a path of the autonomous vehicle toward the destination, the computing using electronic map data corresponding to a current position of the autonomous vehicle;
    computing, using the driving parameters, a current safety envelope of the autonomous vehicle, wherein a boundary of the current safety envelope is representative of closest positions from the current position of the autonomous vehicle where the autonomous vehicle is capable of coming to a complete stop at different steering angle rate changes;
    determining whether boundaries of a safe driving region for the autonomous vehicle wholly contain the current safety envelope; and
    responsive to determining that the boundaries of the current safe driving region do not wholly contain the current safety envelope, adjusting the driving parameters of the autonomous vehicle such that a subsequent safety envelope is wholly contained by the boundaries of the safe driving region.

7. The computer-implemented method of claim 6, wherein the driving parameters comprise at least one of: vehicle speed, vehicle steering angle, or vehicle steering angle change rate.

8. The computer-implemented method of claim 6, further comprising determining current driving state of the autonomous vehicle, the current driving state comprising vehicle position and vehicle speed, wherein the computing of the driving parameters uses the current driving state.

9. The computer-implemented method of claim 6, further comprising predicting, using electronic map data corresponding to a current vehicle position of the autonomous vehicle, the path of the autonomous vehicle from the vehicle position toward the destination.

10. The computer-implemented method of claim 6, wherein the safe driving region is a road lane in which the autonomous vehicle is currently located.

11. The computer-implemented method of claim 6, further comprising executing the computer-implemented method repeatedly at a fixed time interval.

12. The computer-implemented method of claim 6, wherein the driving parameters are computed using a mathematical model of dynamics of the autonomous vehicle.

13. The computer-implemented method of claim 12, further comprising identifying a current driving environment and selecting the mathematical model based on the identified current driving environment for that environment.

14. An autonomous vehicle comprising:
- a propulsion system;
- a steering system;
- a braking system; and
- a computing system that is in communication with the propulsion system, the steering system, and the braking system, where the computing system comprises a processor and memory that stores instructions that, when executed by the processor, cause the processor to perform acts comprising:
  - determining a current driving state of the autonomous vehicle, the current driving state comprising vehicle position and vehicle speed;
  - computing, using electronic map data corresponding to the vehicle position, a path of the autonomous vehicle from the vehicle position toward the destination;
  - computing, using the current driving state, a vehicle steering angle change rate and a vehicle speed that will cause the autonomous vehicle to follow the predicted path;
  - computing, using the vehicle position, the computed vehicle speed, and the computed vehicle steering angle change rate, a current safety envelope of the autonomous vehicle, the current safety envelope having a boundary that is defined by positions where, from the vehicle position, the autonomous vehicle is capable of coming to a complete stop upon maximally decelerating at different steering angle change rates;
  - identifying a current road lane of the autonomous vehicle using the electronic map data and the vehicle position;
  - determining whether the current safety envelope intersects either of the boundaries of the current road lane; and
  - responsive to determining that the current safety envelope intersects at least one of the boundaries of the current road lane, controlling at least one of the propulsion system, the braking system, or the steering system such that at least one of the vehicle speed or the vehicle steering angle change rate of the autonomous vehicle is adjusted to prevent a subsequent safety envelope from intersecting either of the boundaries of the current road lane.

15. The autonomous vehicle of claim 14, wherein the current safety envelope is computed using a mathematical model of dynamics of the autonomous vehicle.

* * * * *